United States Patent

[11] 3,604,961

| [72] | Inventor | Neil Saldinger |
| | | Woodland Hills, Calif. |
| [21] | Appl. No. | 14,464 |
| [22] | Filed | Feb. 26, 1970 |
| [45] | Patented | Sept. 14, 1971 |
| [73] | Assignee | Vernitron Corporation |
| | | Great Neck, N.Y. |

[54] DIRECT CURRENT MOTOR HAVING POLES ARRANGED TO MINIMIZE COGGING TORQUE
3 Claims, 7 Drawing Figs.

[52] U.S. Cl. .................................................. 310/51,
310/154, 310/177, 310/218, 310/254
[51] Int. Cl. .................................................. H02k 5/24,
H02k 23/04
[50] Field of Search .................................................. 310/180,
193, 51, 154, 177, 218, 254, 256, 259, 260, 273,
185, 186, 188

[56] References Cited
UNITED STATES PATENTS

| 1,504,551 | 8/1924 | Haas........................... | 310/51 |
| 2,169,100 | 8/1939 | Lange......................... | 310/218 |
| 2,453,358 | 11/1948 | Bertea........................ | 310/254 |
| 2,498,274 | 2/1950 | Ivy............................. | 310/218 |
| 3,296,472 | 1/1967 | Fisher........................ | 310/186 |
| 3,500,092 | 3/1970 | Heilmann et al............ | 310/51 X |

Primary Examiner—Milton O. Hirshfield
Assistant Examiner—Mark O. Budd
Attorney—Edward H. Loveman ABSTRACT: A direct current motor has a rotatable axially slotted cylindrical armature and an even number of permanent magnet poles. The poles are spaced apart 360°/N where N is the number of poles. The poles can be asymmetrically shaped so that the points of maximum field strength of each pole are spaced 360°/N ±Φ from each adjacent pole to effect cooperative cancellation of cogging torque tending to be generated between the armature and the respective adjacent poles.

PATENTED SEP 14 1971 3,604,961

INVENTOR.
NEIL SALDINGER

BY
*Edward H. Loveman*
ATTORNEY

DIRECT CURRENT MOTOR HAVING POLES ARRANGED TO MINIMIZE COGGING TORQUE

This invention relates to direct current motors having permanent magnet field poles and more particularly to eliminating cogging torques in DC motors of the aforementioned type.

In conventional direct current motors having permanent magnet field poles, cogging torques are introduced during rotation of rotary armatures under the poles. A cogging torque is a position-sensitive periodic-with-rotation torque which occurs in the absence of excitation of the armature. Occurrence of this torque is due to the interaction of the permanent magnet field and the slots in the armature. Because of these slots, the reluctance of the magnetic circuit varies at different points around the armature. This means that the magnetic energy in the airgap field between poles and armature is not uniform at all points circumferentially around the armature. This nonuniformity in magnetic field causes a position-dependent torque known as a cogging torque. This occurrence of cogging torque is manifested by pulsations, throbbing and irregularity in rotational speed which are objectionable at all rotational speeds, but are most noticeable and objectionable at low speeds. Attempts have been made to reduce cogging torque in direct current motors by skewing the slots in the armatures but objectionable cogging torque still remains at low operating speeds.

Accordingly it is a primary object of the present invention to minimize or substantially eliminate cogging torque in a direct current motor.

Another object of the present invention is to provide a direct current motor having negligible cogging torque by imparting asymmetry to the magnetic fields between the permanent magnet poles and slotted rotary armature.

A further object of the present invention is to provide a direct current motor with permanent magnet poles so shaped that asymmetrical magnetic fields are maintained in the airgaps between the poles and a slotted rotary armature.

These and other objects and many of the attendant advantages of this invention will be readily appreciated as the same becomes better understood by reference to the following detailed description when considered in connection with the accompanying drawings, wherein.

Figure 4:
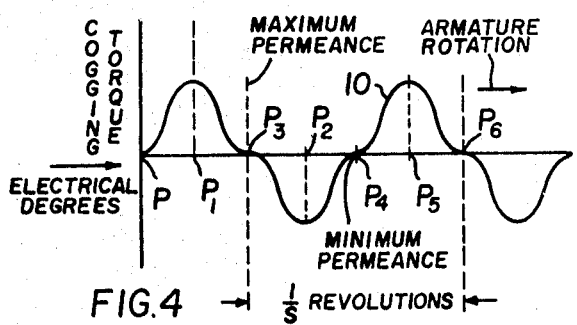
FIG. 4 is a graphic diagram of cogging torque in a motor used in explaining the invention.

Referring now to the drawings wherein like reference characters designate like or corresponding parts throughout the several views there is shown in FIG. 4 a curve 10 of cogging torque plotted against angular shaft position of a rotary armature of a direct current motor which curve starts from any arbitrary point P where the cogging torque is effectively zero. The cogging torque repeats S cycles per revolution, where S is the number of armature slots circumferentially around the cylindrical armature. It will be noted that at point $P_1$ the cogging torque is maximum positive and at $P_2$ the cogging torque is maximum negative and that the maximum magnetic permeance occurs at points $P_3$ and $P_6$. The cogging torque has a complete cycle between points $P_3$ and $P_6$ which represents 1/S revolution of the armature. Thus, if the armature has 24 slots, then there will be a complete cogging torque cycle each one twenty-fourth of a revolution or each 15°. There will be 24 cogging torque cycles per revolution.

Figure 5:
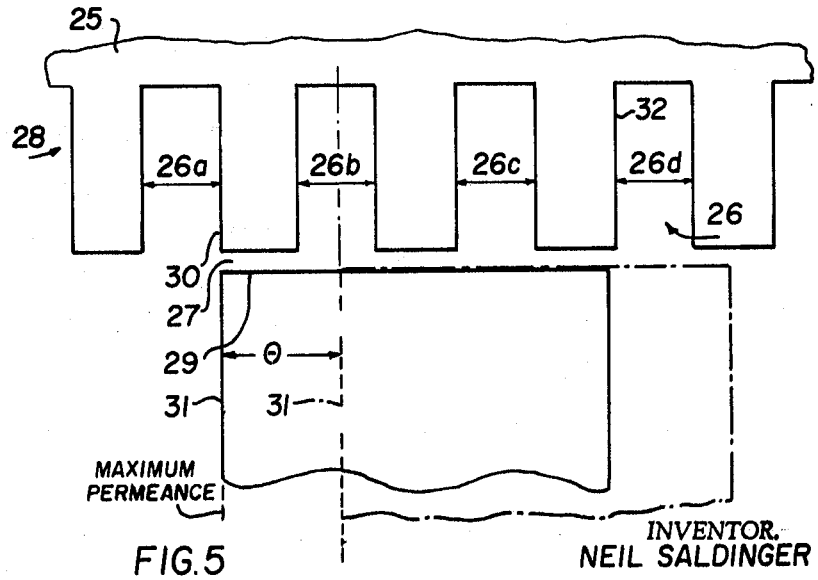
FIG. 5 is an enlarged end view partially diagrammatic in form showing parts of an armature and pole used in explaining the invention.

The relationship between rotary armature position and cogging torque illustrated in FIG. 4 depends on the relative angular positions of the permanent magnet poles and slots in the armature and is illustrated in FIG. 5 where armature 25 has a series of axially extending slots 26 defined between ridges or teeth 28. Current carrying wire coils have been omitted to simplify the drawing. Pole 29 extends between the end 30 of slot 26a across slots 26b and 26c to the beginning 32 of slot 26d. The maximum magnetic permeance exists in airgap 27 between the armature teeth and permanent magnetic pole 29. Suppose now the armature 25 rotates through an angle Φ to locate the center of slot 26b at side 31 of pole 29. Permeance in airgap 27 will now be changed and a maximum cogging torque will result as indicated at point $P_5$ in FIG. 4. This phenomenon occurs inherently in all direct current motors having two poles which are symmetrical on both sides of a bisecting plane including the axis of the rotary armature that is, the poles are spaced exactly 180 electrical degrees apart. In such motor the permeance seen by each pole is identical and the cogging contributed by each pole is identical in magnitude and polarity. Thus the poles cooperate in increasing the undesirable cogging torque.

Now according to the invention it has been discovered that it is possible to substantially eliminate cogging torque produced in a direct current motor by causing the cogging torque normally produced by one pole to cancel substantially the cogging torque produced by another pole. This is accomplished in a two-pole motor 50 illustrated in FIGS. 1 and 2, by cutting off a piece 51 or by shaping body portion 52 of pole 54 and cutting off body portion 56 of pole 58 so that the inner portions 52, 53 and 56 of the poles are not symmetrical with respect to the plane of symmetry A—A of respective outer body portions 61, 58. The amount of asymmetry introduced must be enough to shift the planes of maximum permeance so they are Φ electrical degrees apart. Now one pole sees maximum positive cogging torque while the other pole sees maximum negative cogging torque. This effect is illustrated graphically in FIG. 6. That is, as previously described, poles 54 and 58 would normally reduce the cogging torque illustrated by curve 10 in FIG. 4. However, due to the angular difference in magnetic orientation of the poles, both curves (FIG. 6) are now 180° out of phase with each other. Thus cogging effects produced by both poles (illustrated in FIG. 6 as $T_1$ and $T_2$), are cooperatively substantially cancelled in the motor as indicated by curve T. If there is any residual cogging torque due to irregularities in the periodic cogging torques, it is so small as to be negligible.

Figure 1:
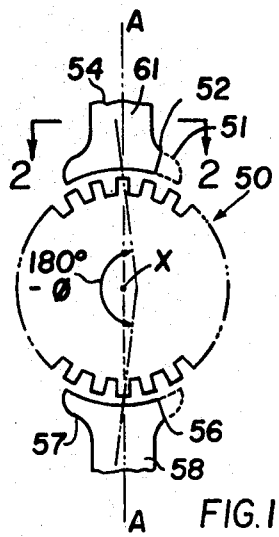
FIG. 1 is an end view diagrammatic in form showing two stationary field poles and rotary armature of a direct current motor embodying the invention.
Figure 7:
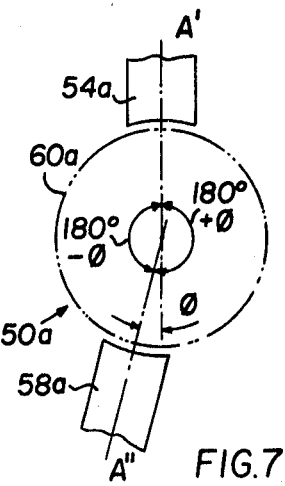
FIG. 7 is a diagram of a two-pole motor used in explaining the invention.
Figure 6:
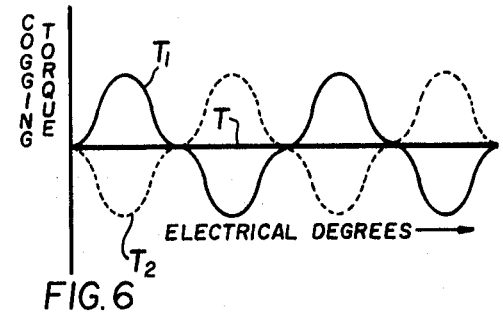
FIG. 6 is another cogging torque diagram used in explaining the invention.
Figure 2:
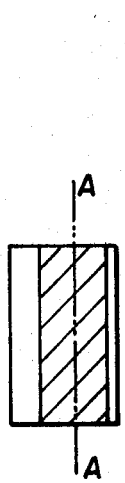
FIG. 2 is a cross-sectional view taken on line 2—2 of FIG. 1, through a field pole.

It may be possible to space the symmetrical poles of a two-pole direct current motor 180°±Φ to effect cancellation of the cogging torque effects. This is illustrated in FIG. 7 where the planes of symmetry A′, A″ of poles 54a, 58a are spaced apart 180°±Φ around armature 60a in motor 50a. The cogging torque cancellation effect illustrated in FIG. 6 is thereby attained. In general however, reshaping or provision of poles which are diametrically opposite each other as shown in FIG. 1, but are shaped to space the planes of symmetry and maximum permeance 180°±Φ is preferable. The motor is easier and more economical to manufacture. Conventional motors can be modified in accordance with the invention, and finer adjustments can be made to ensure displacement of the planes of symmetry and permeance by Φ electrical degrees.

Figure 3:
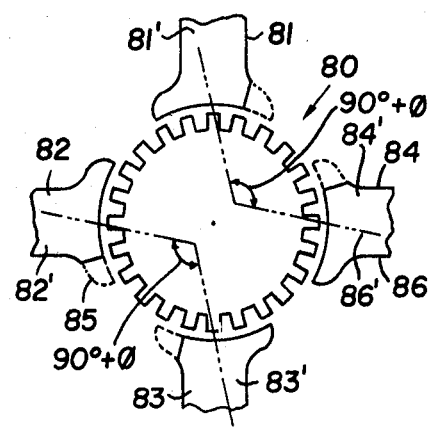
FIG. 3 is an end view partially diagrammatic in form of a four-pole direct current motor embodying the invention.

FIG. 3 shows a direct current motor 80 having four poles 81–84. The poles are all asymmetrical with respect to central planes of outer body portions 81′–84′, inner body portions 85 of the poles have been removed or omitted. The planes of maximum permeance 86 seen by the poles are displaced from the normal 90° by angles Φ. Thus planes of maximum permeance seen by adjacent poles 81, 84 are spaced apart 90°±Φ and similar planes of poles 82, 83 are also spaced apart by 90°±Φ. The net effect is that the cogging effect produced by each pole is instantaneously countered and cancelled by the cogging effect produced by its adjacent poles, and thus cogging torque is thus substantially eliminated in the motor.

The same principles may be applied to motors having any even number of poles such as 2, 4, 6, 8...$n$ poles where $n$ is any even integer, to effect minimizing of cogging torque. The invention can be applied to newly manufactured motors or to existing motors. In all cases the permanent magnet poles will be so shaped and/or located that the poles are spaced $180°\pm\Phi$ for two-pole motors, $90°\pm\Phi$ for four-pole motors, $60°\pm\Phi$ for six-pole motors, $45°\pm\Phi$ for eight-pole motors, etc. Stated otherwise the optimum spacing of symmetrical poles in a direct current motor having an even number of permanent magnet poles will be $(360°/N)\pm\Phi$, where N is the number of poles and $\Phi$ is the spacing in electrical degrees between points or planes of occurrence of maximum and minimum magnetic permeance respectively in the air at each pole.

It should be understood that the foregoing disclosure relates to only a preferred embodiment of the invention and that it is intended to cover all changes and modifications of the examples of the invention herein chosen for the purposes of the disclosure, which do not constitute departures from the spirit and scope of the invention.

What is claimed is:

1. A direct current motor, comprising:
    a cylindrical armature rotatable on its axis, said armature having a multiplicity of slots uniformly spaced apart circumferentially around the armature; and
    an even number of one-piece permanent magnet poles circumferentially spaced apart around the armature and radially spaced therefrom by narrow airgaps, said poles being so shaped and located with respect to each other that cogging torque tending to occur between the armature and one-half of said number of poles is countered and cancelled by cogging torque tending to occur between the armature and the other half of said number of poles, said poles having outer body portions which are symmetrical in shape about their central planes passing through the axis of said armature, said central planes of said poles being spaced apart by $360°/N$, where N is a total number of poles, and said poles having inner body portions adjacent said armature which are asymmetrical with respect to said central planes so that the point of maximum permeance in said airgap of each pole occurs $(360°/N)\Phi$ from the point of occurrence of maximum permeance of each adjacent pole where $\Phi$ is the angle in electrical degrees between the points of occurrence of maximum and minimum permeance respectively of each pole.

2. A direct current motor as defined in claim 1, wherein said number of poles can be any one of the arithmetical series 2, 4, 6, 8...$n$, where $n$ is an even integer.

3. A direct current motor as defined in claim 1, wherein each of said poles has two inner body portions adjacent to said armature on opposite sides of said outer body portion, one of said inner body portions being wider circumferentially of said armature than the other one of said inner body portions.